United States Patent
Delioussine et al.

(10) Patent No.: US 12,125,998 B2
(45) Date of Patent: Oct. 22, 2024

(54) BATTERY PACK DESIGN AND METHOD

(71) Applicant: SOFTBANK CORP., Tokyo (JP)

(72) Inventors: Peter Delioussine, Newbury Park, CA (US); Brian Jensen, West Hills, CA (US)

(73) Assignee: SoftBank Corp., Tokyo (JP)

( * ) Notice: Subject to any disclaimer, the term of this patent is extended or adjusted under 35 U.S.C. 154(b) by 390 days.

(21) Appl. No.: 17/452,067

(22) Filed: Oct. 25, 2021

(65) Prior Publication Data
US 2022/0045384 A1 Feb. 10, 2022

Related U.S. Application Data

(63) Continuation of application No. PCT/US2020/029975, filed on Apr. 25, 2020.
(Continued)

(51) Int. Cl.
*H01M 10/625* (2014.01)
*H01M 10/6552* (2014.01)
(Continued)

(52) U.S. Cl.
CPC ..... *H01M 10/625* (2015.04); *H01M 10/6552* (2015.04); *H01M 10/658* (2015.04); *H01M 50/204* (2021.01); *H01M 50/249* (2021.01); *H01M 50/308* (2021.01); *H01M 2220/20* (2013.01)

(58) Field of Classification Search
CPC .......... H01M 10/625; H01M 10/6552; H01M 10/658; H01M 50/249; H01M 50/308; H01M 50/204; H01M 2220/20
See application file for complete search history.

(56) References Cited

U.S. PATENT DOCUMENTS

2006/0073375 A1   4/2006   Hong
2010/0323234 A1   12/2010  Kim
(Continued)

FOREIGN PATENT DOCUMENTS

CN   208422998 U   1/2019
CN   208637482 U   3/2019
(Continued)

OTHER PUBLICATIONS

Office Action issued for counterpart European Application No. 20794545.2, issued by the European Patent Office on Feb. 17, 2023.
(Continued)

*Primary Examiner* — John J Lee

(57) ABSTRACT

In at least one embodiment, provided is a battery pack for a vehicle including battery pack for a vehicle, the battery pack having a firebox for enclosing batteries, an electronics compartment, thermal insulation surrounding the firebox and the electronics compartment, and heat pipes. The heat pipes may include firebox heat pipes contacting the firebox on an evaporator end and extending to an exterior surface of the battery pack on a condenser end, and electronics compartment heat pipes extending from within the electronics compartment on an evaporators end and extending through the thermal insulation to the exterior surface of the battery pack on a condenser end.

19 Claims, 16 Drawing Sheets

Related U.S. Application Data

(60) Provisional application No. 62/898,543, filed on Sep. 10, 2019, provisional application No. 62/854,711, filed on May 30, 2019, provisional application No. 62/838,926, filed on Apr. 25, 2019, provisional application No. 62/838,783, filed on Apr. 25, 2019.

(51) Int. Cl.
*H01M 10/658* (2014.01)
*H01M 50/204* (2021.01)
*H01M 50/249* (2021.01)
*H01M 50/308* (2021.01)

(56) References Cited

U.S. PATENT DOCUMENTS

| | | | |
|---|---|---|---|
| 2011/0045327 A1* | 2/2011 | Yawata | H01M 50/24 429/82 |
| 2012/0000548 A1 | 1/2012 | Khamitkar | |
| 2012/0169195 A1 | 7/2012 | Eckstein | |
| 2012/0196162 A1 | 8/2012 | Shiraishi | |
| 2012/0219834 A1 | 8/2012 | Park | |
| 2013/0095356 A1 | 4/2013 | Shimizu | |
| 2016/0181676 A1* | 6/2016 | Nubbe | H01M 50/271 429/72 |
| 2016/0293917 A1 | 10/2016 | Matsudo | |
| 2017/0054121 A1 | 2/2017 | Hore | |
| 2017/0077468 A1* | 3/2017 | Gerundt | H01M 10/0525 |
| 2017/0324110 A1 | 11/2017 | Fujii | |
| 2017/0352935 A1* | 12/2017 | Perdu | H01M 50/131 |
| 2017/0358831 A1 | 12/2017 | Milroy | |
| 2018/0123104 A1 | 5/2018 | Lomax | |
| 2019/0296293 A1 | 9/2019 | Scharner | |
| 2020/0220240 A1 | 7/2020 | Cheng | |

FOREIGN PATENT DOCUMENTS

| | | |
|---|---|---|
| DE | 102016225057 A1 | 6/2018 |
| EP | 2293364 A1 | 3/2011 |
| JP | 2006080065 A | 3/2006 |
| JP | 2007018827 A | 1/2007 |
| JP | 2007087731 A | 4/2007 |
| JP | 2007220508 A | 8/2007 |
| JP | 2010135247 A | 6/2010 |
| JP | 2012178333 A | 9/2012 |
| JP | 2013196850 A | 9/2013 |
| JP | 2015018706 A | 1/2015 |
| JP | 2015099675 A | 5/2015 |
| JP | 2018174092 A | 11/2018 |
| WO | 2018187901 A1 | 10/2018 |

OTHER PUBLICATIONS

Extended European Search Report for European Patent Application No. 20796157.4, issued by the European Patent Office on Jun. 8, 2022.

Office Action issued for counterpart Japanese Application No. 2021-563594, issued by the Japanese Patent Office on Nov. 1, 2022 (drafted on Oct. 25, 2022).

Extended European Search Report for European Patent Application No. 20794545.2, issued by the European Patent Office on Jun. 8, 2022.

International Search Report and (ISA/237) Written Opinion of the International Search Authority for International Patent Application No. PCT/US2020/029975, mailed by the United States Patent and Trademark Office on Jul. 1, 2020.

International Search Report and (ISA/237) Written Opinion of the International Search Authority for International Patent Application No. PCT/US2020/029971, mailed by the United States Patent and Trademark Office on Jul. 1, 2020.

* cited by examiner

BATTERY PACK DESIGN AND METHOD

The contents of the following US and PCT applications are incorporated herein by reference:
No. 62/838,783 filed in US on Apr. 25, 2019,
No. 62/838,926 filed in US on Apr. 25, 2019,
No. 62/854,711 filed in US on May 30, 2019,
No. 62/898,543 filed in US on Sep. 10, 2019 and
NO. PCT/US2020/029975 filed in WO on Apr. 25, 2020

BACKGROUND

High altitude long endurance solar powered aircraft have extensive batteries to ensure that the aircraft can maintain flight for long periods of time, which may even be through the night when solar charging is not an option. When there is diminished sunlight or no sunlight the aircraft must rely on stored battery power. As such, in high altitude long endurance aircraft, or in terrestrial vehicles that rely on battery power, the danger of damage to the vehicle from thermal runaway exists.

Catastrophic thermal runaway events in battery packs typically generate intense heat and outgassing, which can cause destructive damage to the vehicle. In any vehicle this can lead fires and critical failures, which is particularly problematic for airborne vehicles in flight.

What is needed is a battery pack structure and thermal management system for vehicle battery packs. In more specific applications, what is needed is a battery pack structure and thermal management system for high altitude sustained fight solar powered aircraft utilizing battery storage.

DESCRIPTION OF EXEMPLARY EMBODIMENTS

Figure 1:
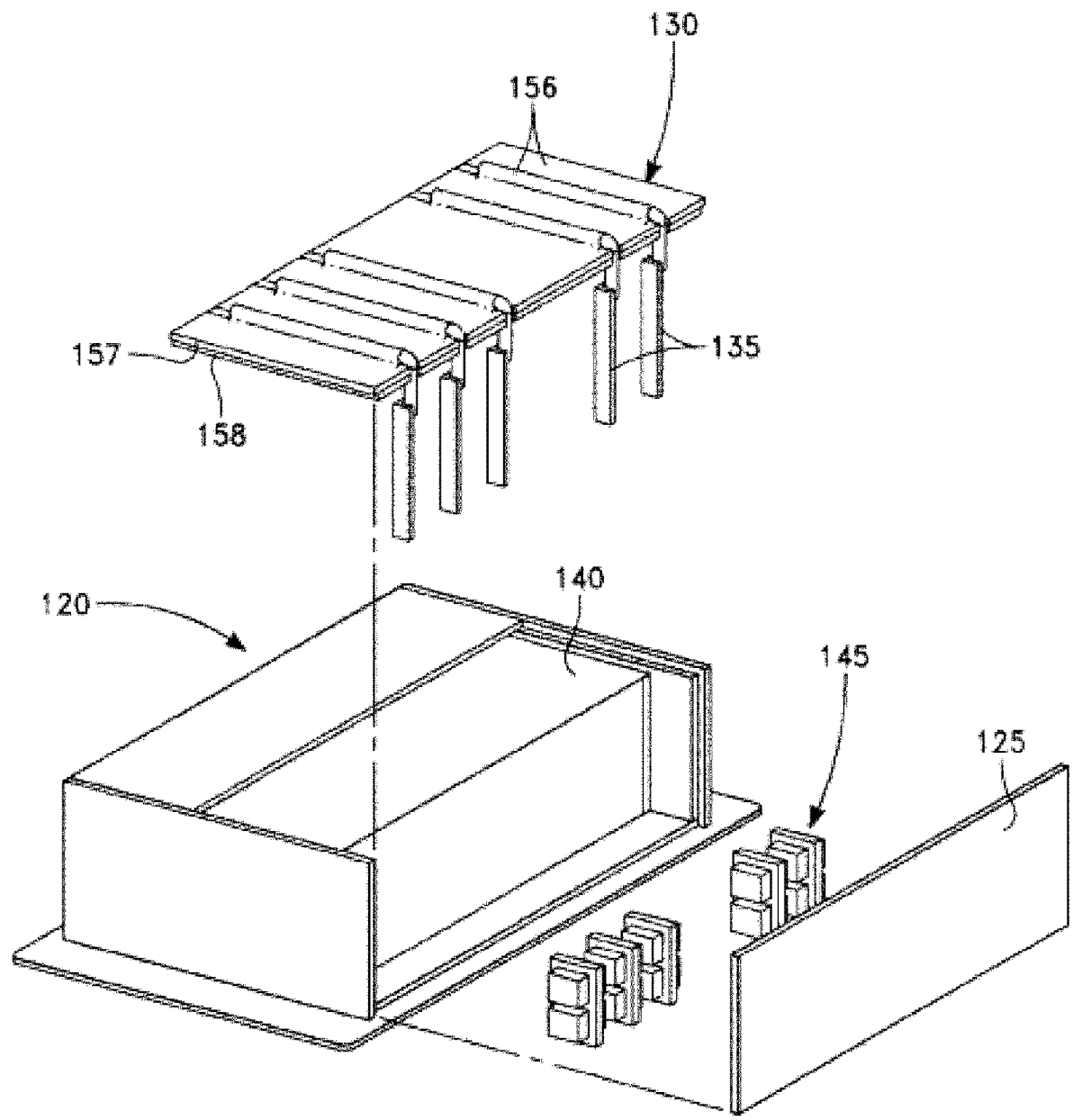
FIG. 1. is a partially exploded perspective view of a battery pack.

FIG. 1. is a partially exploded perspective view of a battery pack. Provided in at least some embodiments is a structural design that integrates a firebox firewall 140, two different types of insulation 557 and 558 (FIG. 5), and heat pipes 135. This enables cooling of both battery electronics 145, such as a maximum power point tracker (MPPT) and/or in some embodiments also a motor controller unit, which may be situated adjacent to the battery in the battery pack 120.

The battery pack 120 contains battery cells (not shown) which are contained within a thin metal fire box 140. In one embodiment, the fire box 140 is made of 1½ thousandths inch thickness stainless steel, or the like. In one embodiment, the fire box 140 makes use of titanium as a fire barrier.

Within the battery pack 120 adjacent to the firebox 140 is an electronics compartment for housing the battery electrics 145, such as MPPTs. In some embodiments, it may also contain a motor controller unit, or other related electronics. In some embodiments, the MPPT will be housed outside the firebox firewall, but inside the battery pack insulation envelope. The heat generation of the MPPT helps heat the batteries, but necessitates the need for a cooling solution. The thermal mass of batteries smooths out temperature fluctuations and allows lighter cooling and insulation solution. For this, variable conductance heat pipes may be utilized. Variable conductance heat pipes or VCHPs turn on above a set temperature so can be selected to turn on above a selected temperature.

An insulating side enclosure wall 125 along with an insulating top enclosure wall 130 provide enclose the electronics side of the battery pack, and also may function as access panels to the battery pack 120 and electronics compartment on the electronics side of the battery pack 120. The walls 125 and 130 may contain aerogel insulation, such as vacuum sealed NANOPORE. The top wall 130 may further have an interior facing layer 158 of polyimide foam, such as SOLIMIDE, adjacent the battery enclosure 140 to insulate against extreme heat that could be generated during at thermal runaway. Optionally polyimide foam, such as SOLIMIDE, could be provided on the interior of the side wall 125, or on a electronics facing wall of the firebox enclosure 140, if desired.

Heat pipes 135 extend from within the electronic compartment at an evaporator end to an exterior facing side of the aerogel insulation of the wall 130 at a condenser end. Pyrolytic graphite sheet or PSG is to be adhered over the heat pipes 135 to secure them to the top wall 130, and to provide heat spreading. Also optionally, PSG could be interposed between the aerogel insulation of the wall 130 and heat pipes 135.

In some embodiments, the heat pipes 135 may be located adjacent to, or secured or mounted, or removably mounted, to the battery electronics 145. Additionally, or instead, the heat pipes 135 may be mounted, or removably mounted to a bottom surface of the interior of the battery pack. Thus, the heat pipes 135 may be located to correspond with battery electronics modules 145.

Figure 2A:
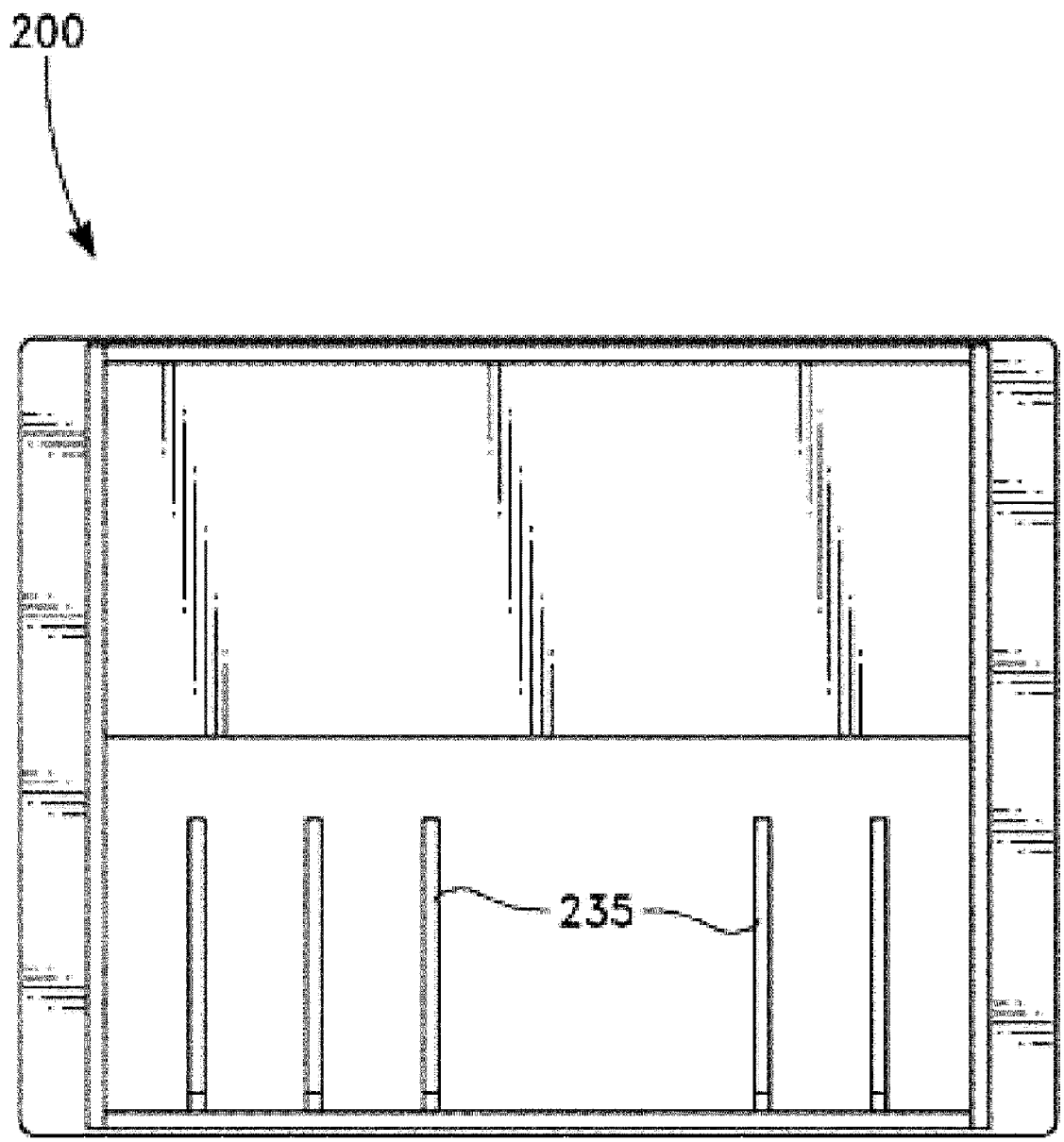
FIG. 2A is a top view of the battery pack.

FIG. 2A shows a top view of the battery pack 120 showing the top wall in place enclosing the battery pack 120. Heat pipes 235 extend across the top of the top wall on the condenser end.

Figure 2B:
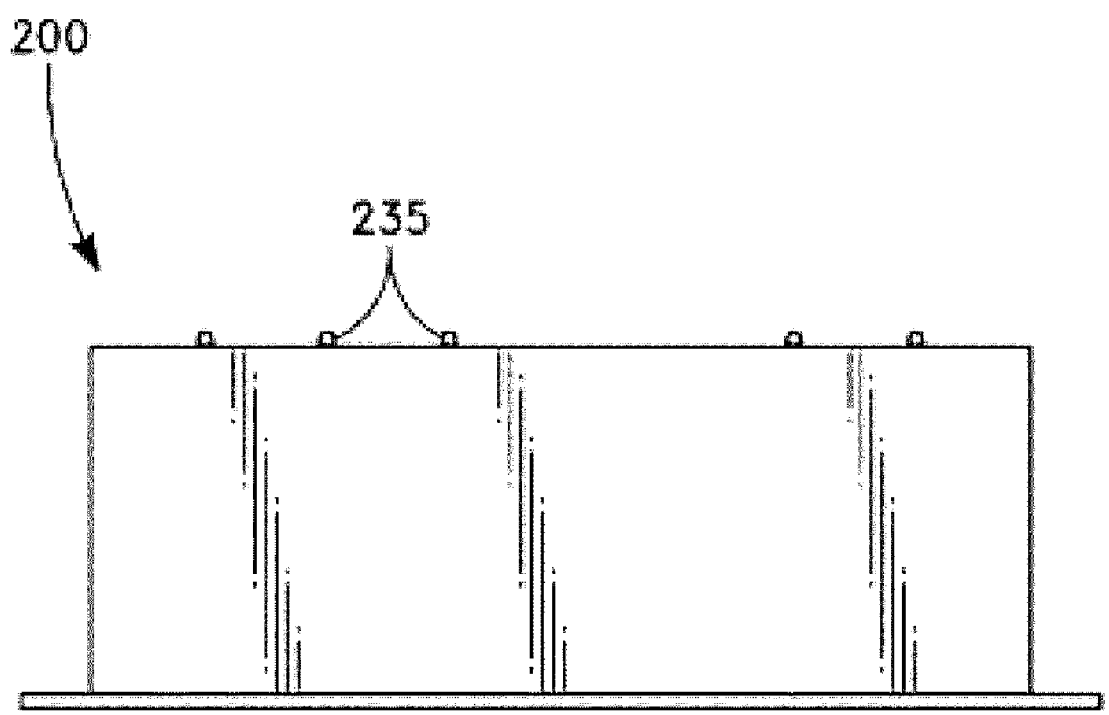
FIG. 2B is a side view from an electronics side of the battery pack.

FIG. 2B is a side view from an electronics side of the battery pack showing the side wall in place enclosing the battery pack 120. The condenser end of the heat pipes 235 extend across the top of the top wall.

Figure 3A:
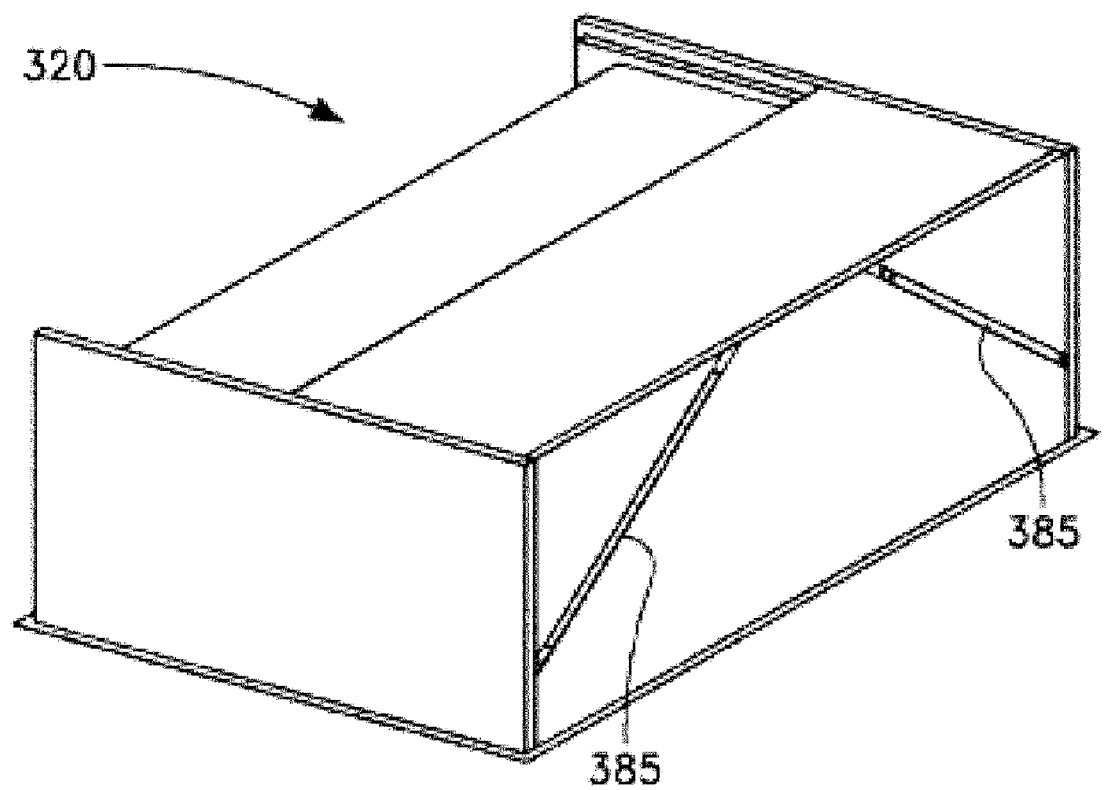
FIG. 3A illustrates a perspective view of a fire box enclosure from a firebox side of the battery pack.

FIG. 3A illustrates a perspective view of a firebox side of the battery pack 320. Shown are heat pipes 385 which are placed adjacent to, or even contact, the firebox on an evaporator end and extend to the exterior surface (shown) of the battery pack on a condenser end. In some embodiment, it is possible that the heat pipe may be recessed into a groove in the NANOPORE aerogel, if desired. In other embodiments, the PGS may secure it to the NANOPORE aerogel.

Figure 3B:
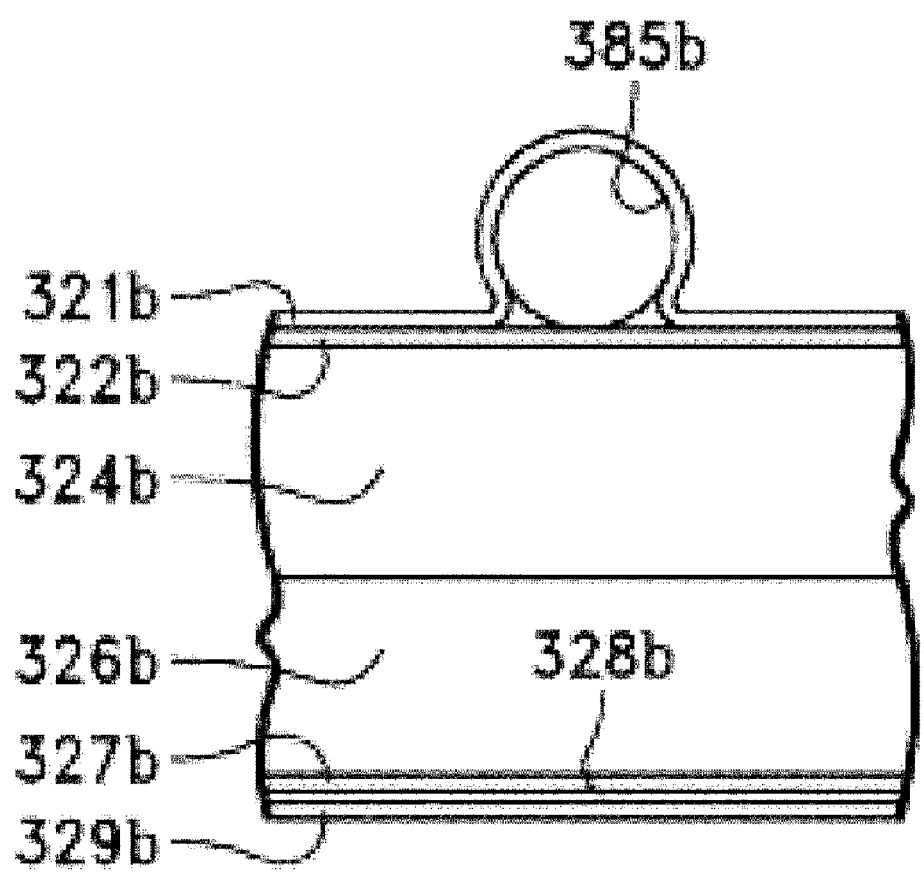
FIG. 3B is a cut away side view of a portion of a sidewall of the firebox side of the battery pack taken along the 3B-3B line of FIG. 3A.

FIG. 3B is a cut away side view of a portion of a sidewall of the firebox side of the battery pack 320 taken along the 3B-3B line of FIG. 3A. Shown is the condenser end of the heat pipe 385b on an exterior surface of the NANOPORE aerogel 324b. The NANOPORE aerogel 324b is located on an interior facing side of the heat pipe 385b. This embodiment shows two layers of PSG 321b and 322 on an exterior side of the NANOPORE aerogel 324b. One layer of PGS 322b is located between the heat pipe 385b and the NANOPORE aerogel 324b. The heat pipe 328b is secured against the NANOPORE aerogel 324b by the PSG layer 321b. The firebox enclosure 328b is between the PGS layers 329b on an interior facing side of the firebox 328b and 327b on an exterior facing side of the firebox 328b. The SOLIMIDE polyimide foam 326b is between the firebox 328c and the NANOPORE aerogel 324b.

Figure 3C:
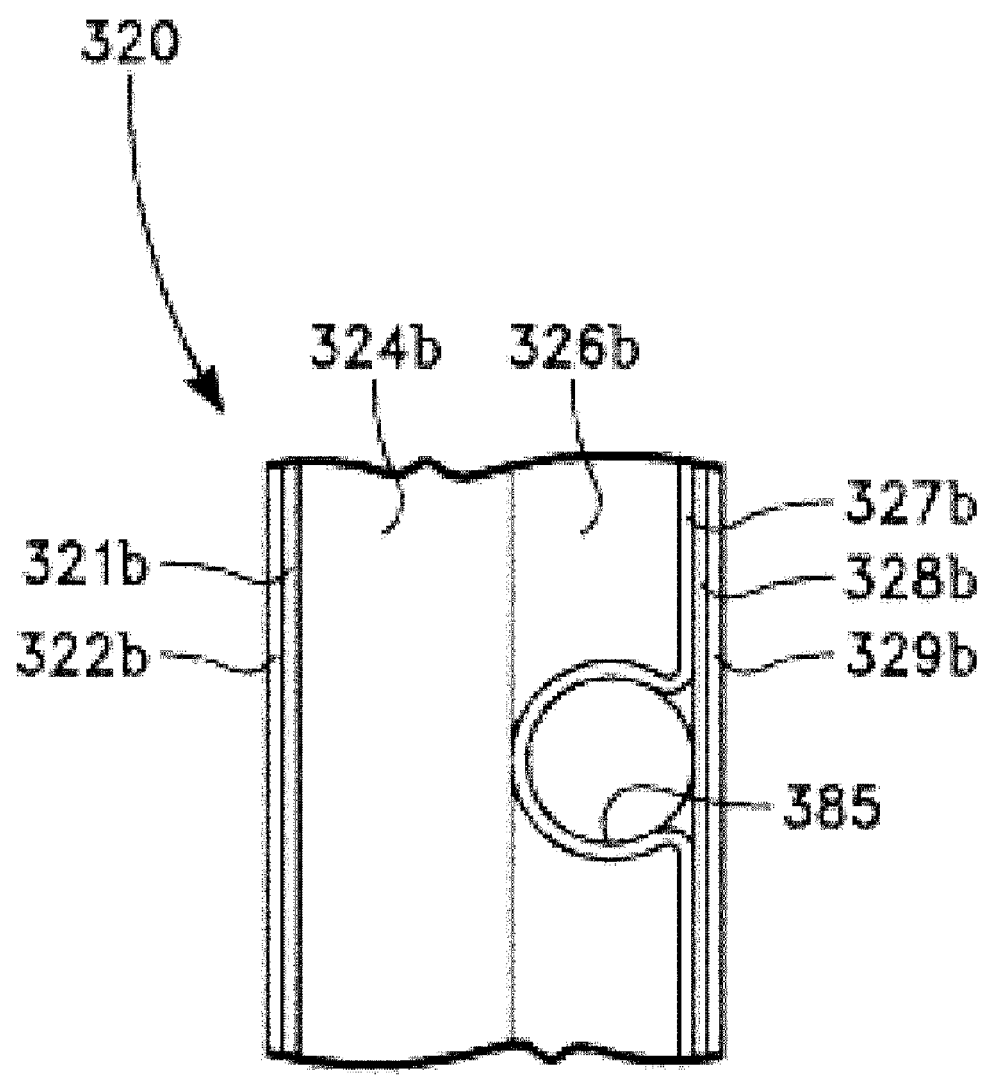
FIG. 3C is a cut away side view of a portion of a sidewall of the firebox side of the battery pack taken along the 3C-3C line of FIG. 3A.

FIG. 3C is a cut away side view of a portion of a sidewall of the firebox side of the battery pack taken along the 3C-3C line of FIG. 3A. Shown is the evaporator end of the heat pipe 385 contacting an exterior surface of the firebox 328c. The NANOPORE aerogel 324c is located on an exterior facing side of the heat pipe 385c. This embodiment shows two layers of PGS 321c and 322c on an exterior side of the NANOPORE aerogel 324c. The heat pipe 328c is secured against the firebox 328c by the PGS layer 327c and is embedded in the SOLIMIDE polyimide foam 326c that is between the firebox 328c and the NANOPORE aerogel 324c.

Referring to FIGS. 1-3C, in various embodiments, the MPPT will be housed outside the cell firewall, but inside the pack insulation envelope. Variable conductance heat pipes or VCHPs provide a passive method to accurately control temperature, by controlling the length of active condenser. The radiators would be comprised of Pyrolytic Graphite sheets, which are lightweight and excellent thermal conductors. The pyrolytic graphite sheet directs heat toward evaporator and away from condenser. The variable conductance heat pipes may be used to maintain temperature control of the electronics, i.e. the MPPTs, and the battery enclosure box. Furthermore, in high altitude long endurance aircraft, the ambient conditions could potentially go from about −85° C. to about 50° C., while the battery temperature should be optimally operated, or maintained, from about 10° C. to about 50° C. As such, VCHPs with different operating temperature ranges may be selected and utilized for firebox cooling than are selected and utilized for electronics cooling.

Figure 4A:
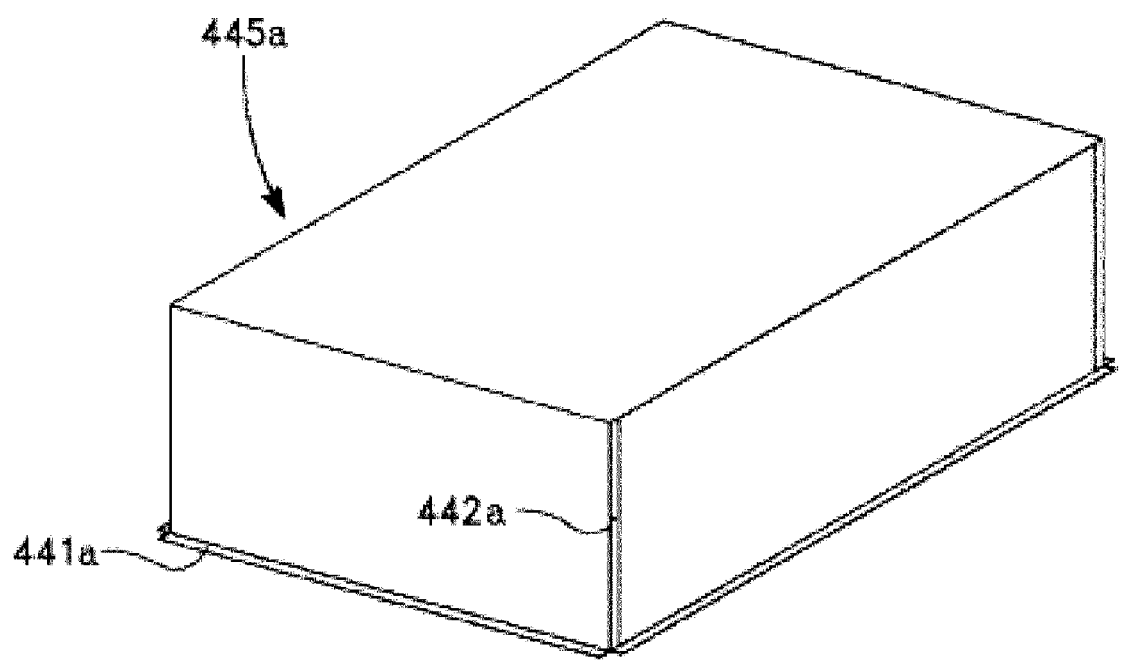
FIG. 4A illustrates a perspective view of a fire box enclosure.

Turning to FIG. 4A, in one embodiment, the fire box 140 (FIG. 1) includes a fire box enclosure 445a that is a five sided box shape that can be placed over battery cells to contain the cells within. The enclosure 445a has a flange 441a which will mount with a fire box base (not shown in FIG. 4A).

Figure 4B:
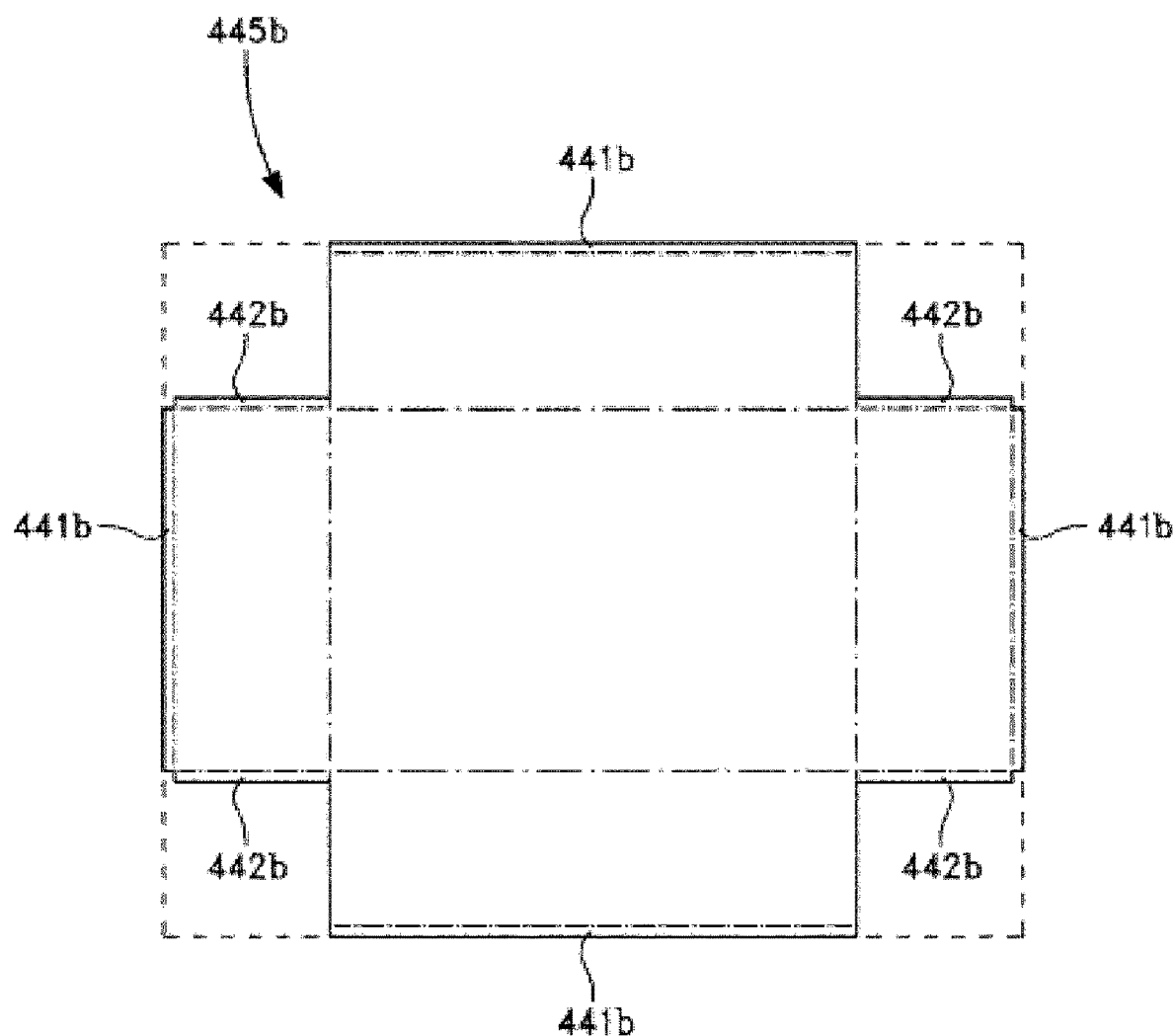
FIG. 4B illustrates a plan view of an enclosure cut out.

FIG. 4B illustrates an enclosure metal cut out 445b, which will be folded and bonded together, such as by welding, to form the enclosure 445a (FIG. 4A). The cut out 445b includes flaps 442b for bonding with adjacent sides, such as by seam welding, when folded into the enclosure lid 445a. The base flange flaps 441b, will be folded to form the flange 441a (FIG. 4A), which will mount with the base of the fire box (not shown in FIG. 4A).

Figure 5:
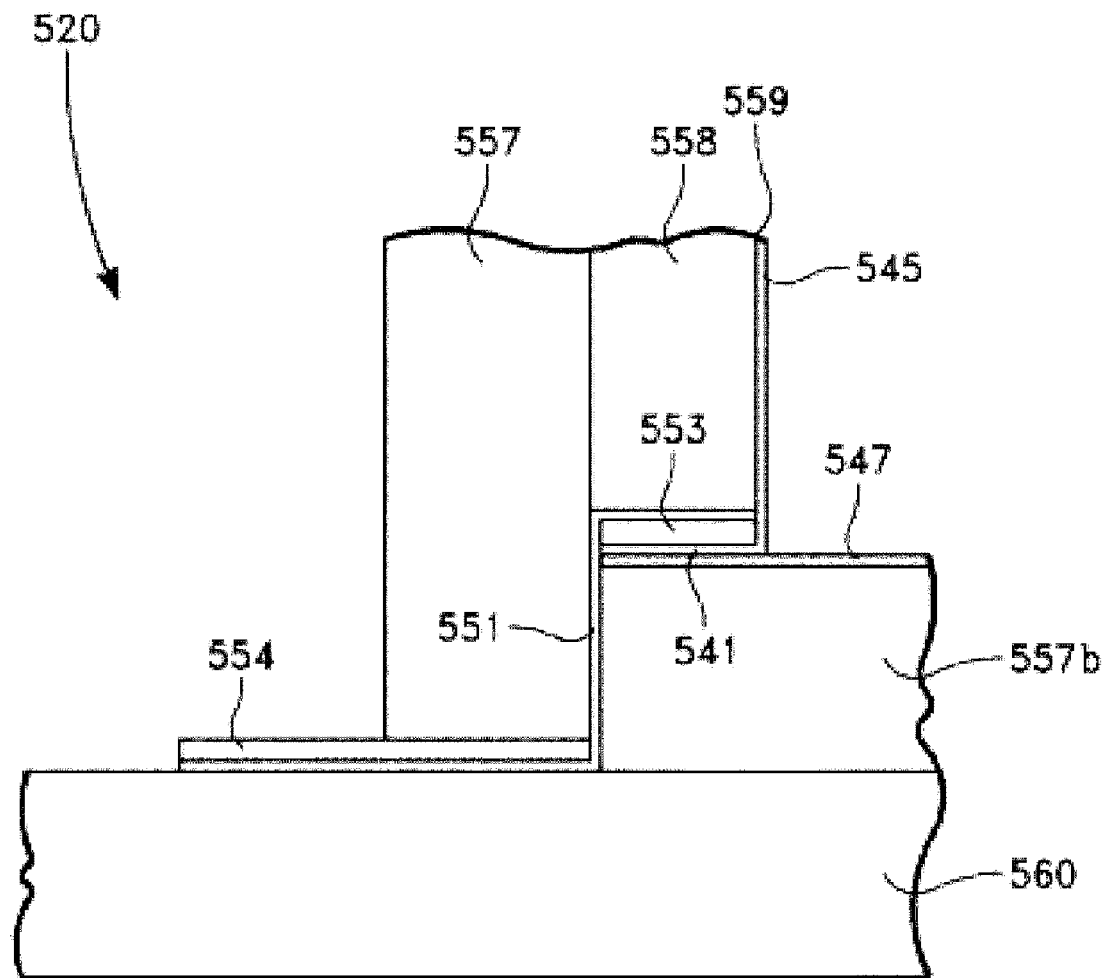
FIG. 5 shows a cut away cross sectional side view of a portion of the battery pack.

FIG. 5 shows a cross sectional view of a portion of the battery pack 520 depicting the mounting detail of the enclosure 545 to the fire box base 547, which may also be stainless steel, titanium, very high temp light weight alloys, or the like. The fire box base 547 is larger than the opening of the enclosure 545 so that the flange 541 mates with and along the fire box base 547. A base flange reinforcement 553 is placed on an exterior of the enclosure flange 541. A securing flange 551, which may also be stainless steel, holds the flange reinforcement 553 against the enclosure flange 541, and secures it. Top flange reinforcement 554 holds the securing flange 551 to the base plate 560. An interior layer 558 of polyimide foam, such as SOLIMIDE, is provided to insulate against extreme heat of generated during thermal runaway, while a prime exterior layer 557 of aerogel or vacuum panel insulation, such as NANOPORE, surrounds the SOLIMIDE interior layer 558, and an insulating layer 557b of aerogel insulation, such as NANOPORE, is located under the fire box base 547, to contain the heat to protect the surrounding airframe. Pyrolytic Graphite Sheet (PGS) (not shown) may be provided at interface 559 between the fire box enclosure 545 and the SOLIMIDE polyimide foam interior layer 558 to spread heat and help with transfer heat from the fire box enclosure 545 with variable conductance heat pipes (not shown), and to inhibit, or even prevent, localized hot spots in general and during thermal runaway. In some embodiments, pyrolytic graphite sheet may also be adhered to the interior surface of the fire box enclosure 545 for further protection.

Thus, in one embodiment, the battery enclosure makes use of stainless steel as a fire barrier. The prime insulation is made up of vacuum sealed NANOPORE aerogel insulation, which is spaced away from the firewall by a layer of SOLIMIDE polyimide foam. The prime insulation made up of vacuum sealed NANOPORE aerogel insulation is further encapsulated with a reinforced polyimide film, such as reinforced KAPTON. This is especially lightweight insulation that is ideal for aircraft.

Figure 6:
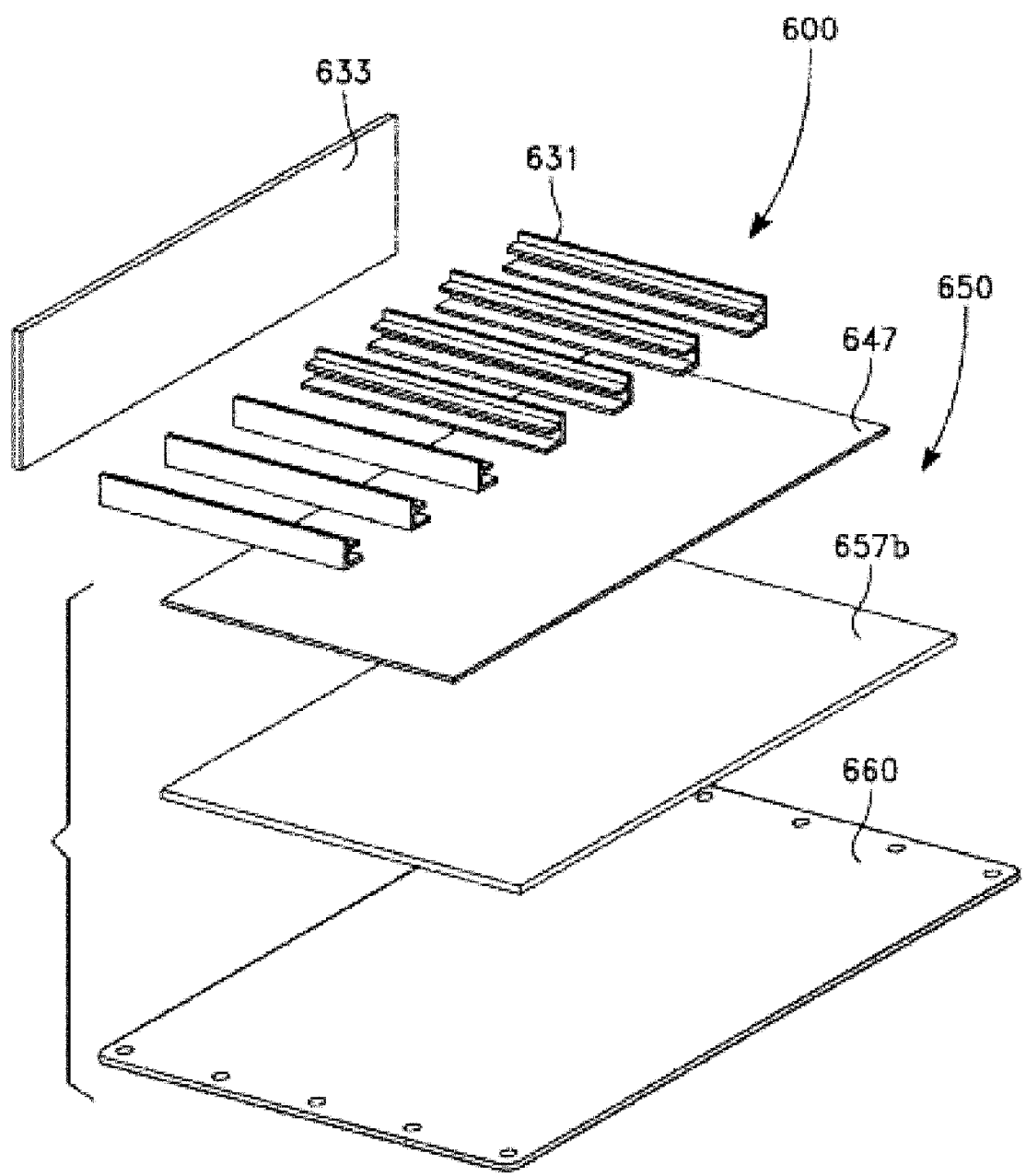
FIG. 6 is a perspective view showing an exploded view of the base structure.

FIG. 6 shows an exploded view of the base assembly 600, which includes the fire box base 647, the bottom NANOPORE aerogel insulation 657b, and the base plate 660. To prevent thermal leaks, the battery cell support structure, i.e. battery cell rails 631 and a battery preload plate 633 is bonded to the stainless steel firebox base layer 647, which itself is adhered to the NANOPORE aerogel insulation 657b.

Figure 9:
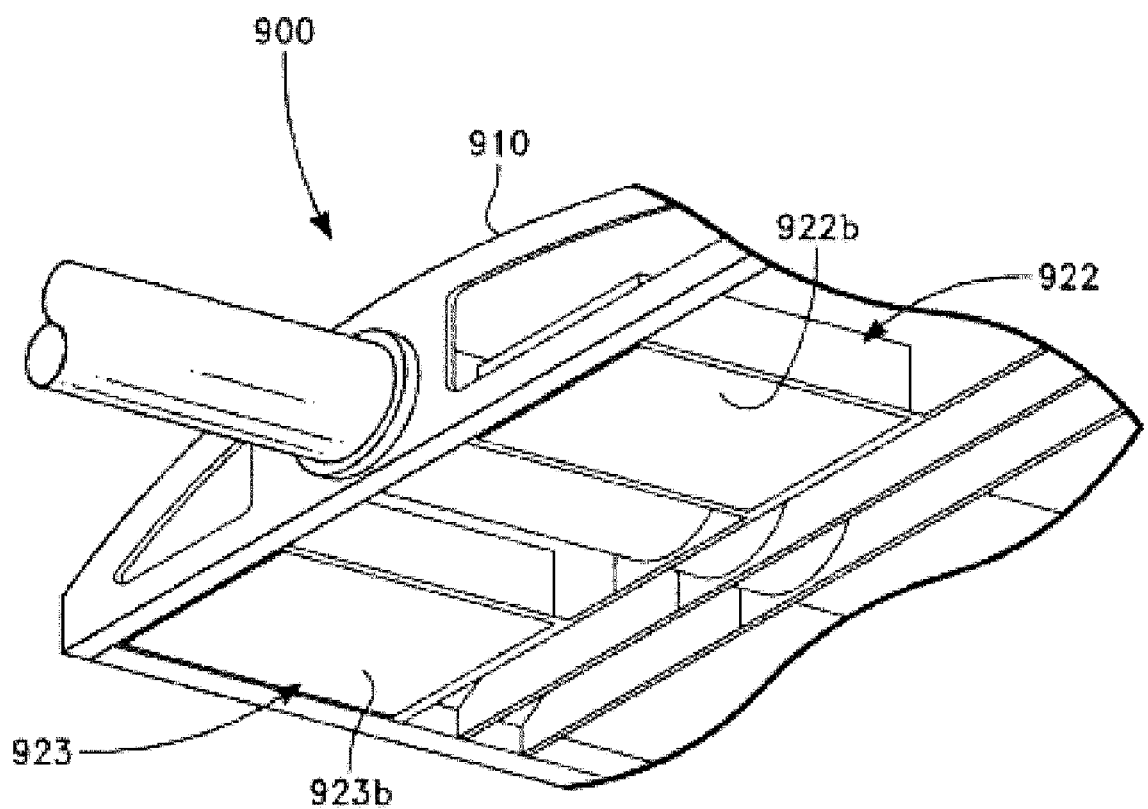
FIG. 9 is a cut away perspective view of showing the structural framework of a portion of an aircraft wing, viewed from the underside of the wing.

FIG. 9 shows the structural framework 900 of a portion of an aircraft wing 910, viewed from the underside of the wing 910. The battery packs 922 and 923 are mounted into the wing 910 so that the bottom surface 922b and 923b of the battery packs become the outer surface of the wing 910. Thus, the bottom surface 922b and 923b of the battery packs 922 and 923 will be in the airstream on the underside of the wing 910 when in the aircraft is in flight.

With some embodiments, in attaching the firewall to the base plate which may be an aircraft exterior panel (as shown in FIG. 9), the batteries need to sit on a stack of insulation because the bottom base plate may be exposed to ambient temperatures. So, aerogel is placed on top of the base plate. The NANOPORE or aerogel isn't guaranteed to survive, or at least the outer vacuum seal covering is not guaranteed to survive. In order to not to lose mechanical integrity while thermal runaway is happening, the entire structure has a peripheral foundation of ceramic material (not shown). So, the firewall is actually seated on top of a foundation of ceramic insulation material. Although the ceramic is at least 10 times worse insulation value than the aerogel, it provides better structural support during a runaway. Further, the peripheral ceramic structure proves better support for mounting on, as it is durable enough to use with mechanical fasteners, such as screws, bolt, or the like. The aerogel may then be placed within the perimeter of ceramic material surrounding it, and supporting the firebox containing the battery within it. The ceramic material may be ZAL-15, by Zircar Ceramics, of Florida, NY and the NANOPORE aerogel vacuum panel insulation may be obtained from NanoPore Incorporated, Albuquerque, NM, or www.nanopore.com.

In some further embodiments, a layer of SOLIMIDE polyimide foam may be between firebox base and the NANOPORE aerogel.

In addition to the stainless steel firewall, part of the strategy for thermal runaway is instead of trying to contain a high pressure of a thermal run away it is taken out far away from the internal airframe and components. This battery pack minimizes pressure build up associated with a thermal runaway event and relies on the stainless steel firewall to make sure no hot gas products get in the air frame. To prevent damage to the airframe, insulated vent plugs are implemented to vent gases external to the wing.

Figure 7:
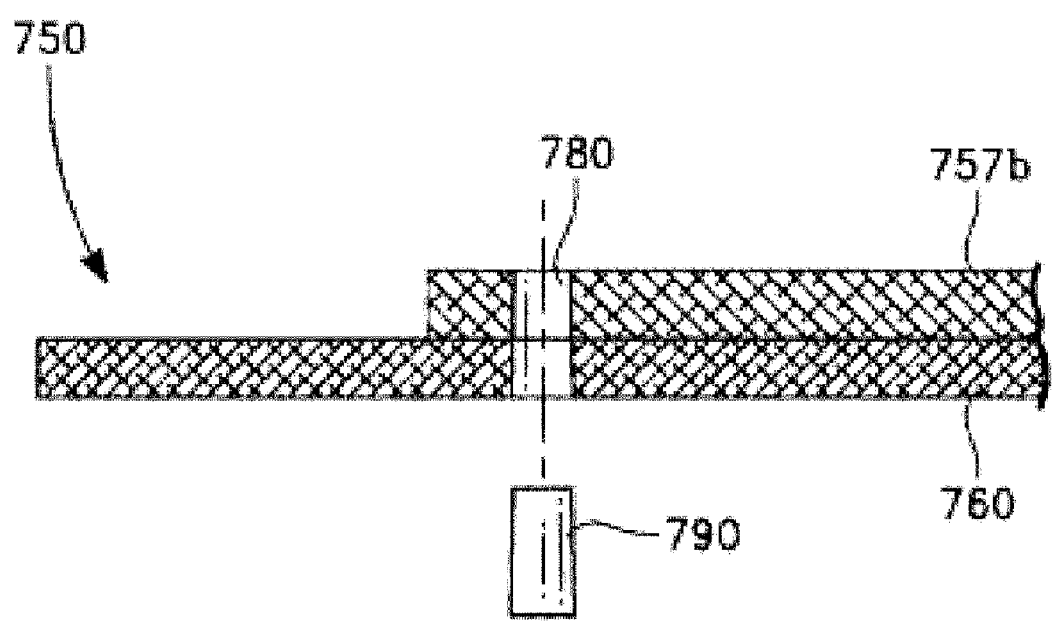
FIG. 7 cut away side view of a thermal runaway flame vent in accordance with and embodiment of the present invention.

Shown in FIG. 7 is a cut away side view of the base portion 750 showing a flame vent 780, which has a vent plug 790 normally within the flame vent 780, but which is forced out due to the pressure generated by thermal runaway. The flame vent 780 extends through the NANOPORE aerogel insulating base layer 757b and through the base plate 760. In some embodiments, it may additionally extend through the entire bottom structure 650 (FIG. 6), including the fire box base 647 (FIG. 6), depending on location of the vent 780 and the desired flow volume anticipated during a thermal runaway. If the bottom structure 650 contains additional layers, the vent could extend through any additional layer. The vent allows the hot gases developed during a thermal runaway to be vented to the exterior of an aircraft rather than venting into the aircraft potentially causing damage to the aircraft components and airframe. Such damage could be particularly problematic if the aircraft is in flight as it could cause catastrophic failure and jeopardize the entire aircraft and crew onboard.

Figure 8A:
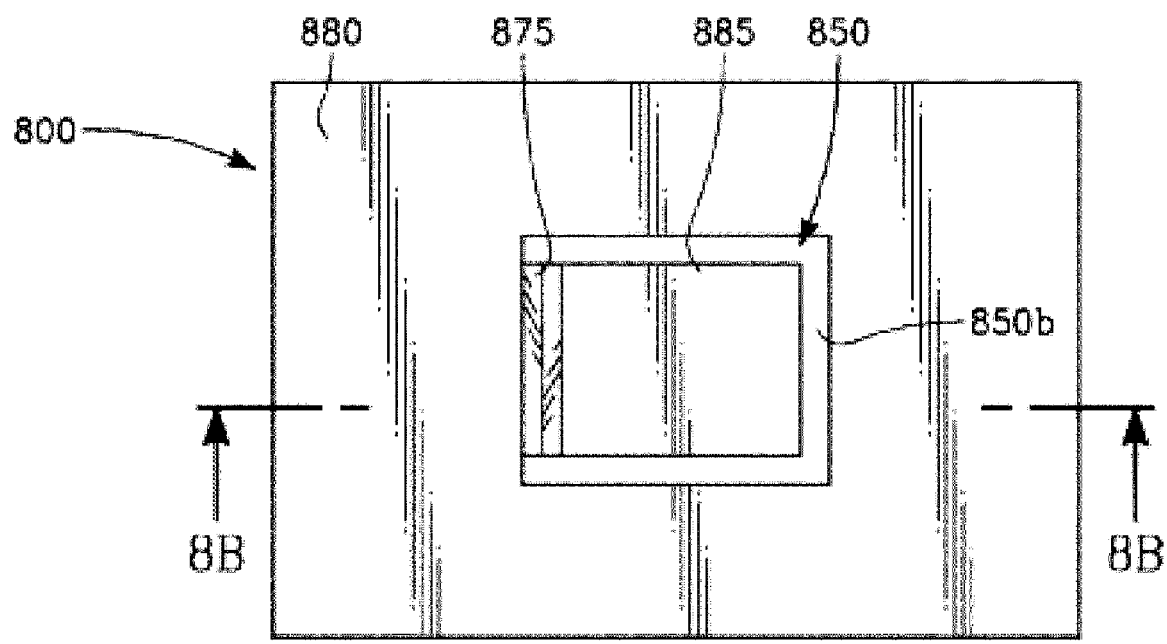
FIG. 8A is a top view of a pressure relief cover structure having a frangible vent cover.

Shown in FIG. 8A is a top view of a pressure relief cover structure 800 having a frangible vent cover 885 in accordance with and embodiment of the present invention. Referring to FIGS. 7 and 8A, the frangible vent cover 885 holds in the plug 790, when there is no thermal runaway failure. The surrounding material 880 may be used to secure it to the underside of the battery pack, such as to the exterior facing side of the base plate 760. Or, in some embodiments it may be placed inside the battery pack, such as between the insulating layer 757b and the exterior layer 760.

Figure 8B:
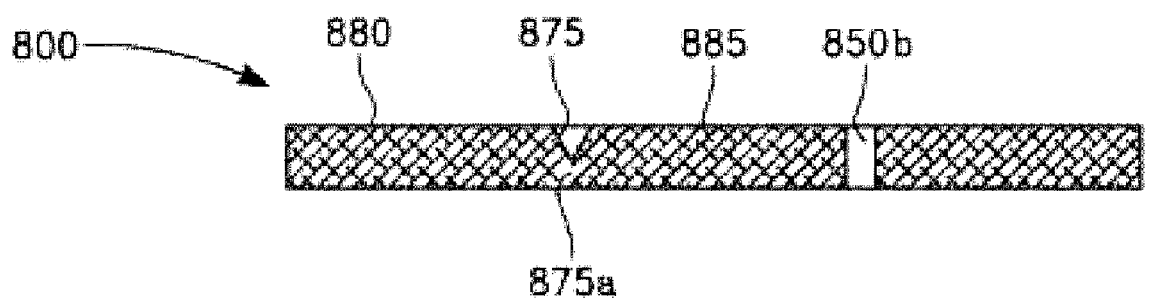
FIG. 8B is a side view of a pressure relief cover structure of FIG. 8A taken along the 8B-8B line.

FIG. 8B is a side view of a pressure relief cover structure 800 of FIG. 8A taken along the 8B-8B line. The vent cover may be fabricated by scoring the cover to provide a break away line 875 so that the pressure of a thermal runaway will cause the vent cover 885 to break off at a weakened region 875a under the score 875 as shown in FIG. BC.

Figure 8C:
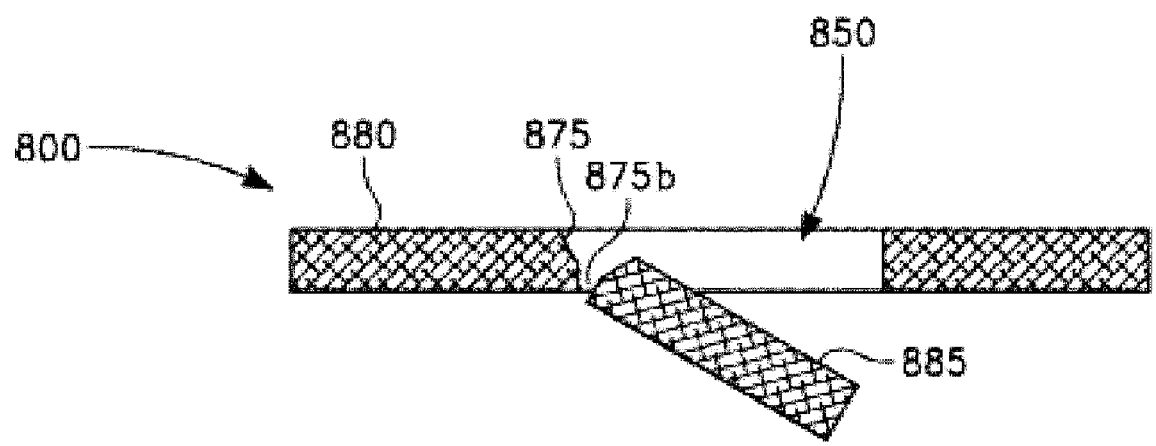
FIG. 8C is a side view of a pressure relief cover structure of FIG. 8B after the frangible vent cover breaks away.

FIG. 8C shows a side view of the pressure relief cover structure of FIG. 8B after a thermal runaway event causes the frangible vent cover 885 to break away and detach at a break or fracture region 875b. During a thermal runaway all the gases are vented straight out the bottom of the aircraft. But it is not possible to have an open vent to the atmosphere that is sufficient to vent a thermal runaway. For this, a super low pressure, super lightweight thermal provided that is not going to hold pressure relief frangible vent cover run-away device vent is any pressure. It is a design to substantially but not completely cover the vent. In any thermal runaway event, a large amount of gases develops. The frangible vent cover is not designed to hold any pressure, but will break away to keep the gases from going into the airframe and damaging the aircraft.

A frangible flexure 885 is used in order to accomplish this. A pad or cover structure 800 is attached to the rest of the battery base. A very thin piece of G10 or FR4, or other similar composite material like fiberglass, that has consistent properties is tuned to have a predetermined breaking region in both force required and location of break. A score line 875 is added to this so that the cover structure 800 is strong enough so during takeoff, turbulence, etc. that the frangible cover or door does not fly open and release the plug. But, when a certain predetermined internal pressure differential is achieved, for example, at about 1.0 psi or less, or in some embodiments about ½ psi or less, or in yet others about ¼ psi or less, it will break away to allow venting of the thermal runaway gases from inside the battery pack to the outside of the aircraft. At that point, that battery pack is lost, but at least the airframe is protected.

To prevent the cover 885 from breaking due to pressure differential from changes in altitude, in some embodiments, there is provided enough space in the gap 850b between the surrounding material 880 and the cover 885 to allow some air leakage, to allow pressure equalization as the aircraft ascends and descends.

The scoring 875 of the vent cover 885 may be accomplished with a miniature table saw, tilted to 45 degrees, with the axial height set very precisely. The saw may be run across the vent covers so they create very consistent depth cuts. For example, to form the score 875, the depth is adjusted to only partially cut into the cover structure 800 to cut a "V" like profile groove by cutting on a single side, or by cutting both sides of the "V". The saw angle and axial height may be adjusted to cut the channel opening 850b all the way through the cover structure 800 around the breakaway vent cover 885, leaving only the weakened region 875a under the score 875. The miniature table saw is set to appropriate depth positions and corresponding angles, for forming the score line 875 and/or the channel opening 850b. Other known cutting and scoring techniques may be employed, such as lasering, routing, stamping, thermal cutting, drilling, etc. For example, perforations or the like may be utilized instead of or in conjunction with the saw cuts to form the weakened region that will determine or control where the vent cover will fracture from the surrounding structure, such that the plug is released from the vent to open the vent and relieve the pressure of a thermal run away. In yet another embodiment, the cover structure may be fabricated with a weaker region, for example a region with less material or thinner material than the adjacent or entire surrounding region and/or the vent cover, or a different more brittle material than the adjacent or entire surrounding region and/or than the vent cover to determine or control where the vent cover will fracture from the surrounding structure, such that the plug is released from the vent to open the vent and relieve the pressure of a thermal run away. Thus, the pressure relief frangible vent cover is adapted to at least partially cover the vent hole plug to retain the vent hole plug in the vent hole until the thermal runaway gases exert a force on the vent hole plug sufficient to force the vent hole plug from the vent hole by forcing the vent hole cover to yield and release the vent hole plug from the vent hole in response to the pressure of the vent hole plug on the vent hole cover.

Thus, in various embodiments the pressure relief frangible vent cover is adapted to at least partially cover the vent hole plug to retain the vent hole plug in the vent hole until the thermal runaway gases exert a force on the vent hole plug sufficient to force the vent hole plug from the vent hole by forcing the vent hole cover to yield and release the vent hole plug from the vent hole in response to the pressure of the vent hole plug on the vent hole cover.

As such, in various embodiments, the weakened region may be the sole connection to the surrounding material support for the vent hole cover. In at least some embodiments, the surrounding material is a mount used to mount the cover structure to the battery pack base plate. In some embodiments, the mount need not completely or partially surround the vent hole cover, but instead could just extend from the weakened region for mounting purposes.

The frangible vent cover may be provided for a structural design that integrates a firewall, two different types of insulation, and variable conductance heat pipes to enable cooling of both battery and the MPPT or maximum power point tracker, and/or the motor controller unit, which may be situated adjacent to the battery in some embodiments.

Referring to FIGS. 1-9, variable conductance heat pipes are utilized for cooling the battery pack when needed during normal operation. Whereas a normal heat pipe is super conductive all the time, variable heat pipes are only conductive when the temperature is within a certain range, i.e. it warms up. So, at night, when the batteries are not producing much heat, the variable heat pipes cool off and do not continue to cool. Conventional heat pipes would overcool the battery pack. As such, the variable heat pipes are selected for a temperature range so that they "turn off" at night and turn on, during the daylight when the battery system is hotter due to daytime charging and daylight thermal heating. In high altitude applications, the ambient temperature can drop for example to around negative 86 degrees Fahrenheit, some electronics are designed to operate only as low as negative 40 degrees Fahrenheit. As such, it is important to inhibit cooling when the ambient temperature to low, to prevent overcooling of the electronics and battery cells.

The variable heat pipes function similar to normal heat pipes except that depending on the temperature and pressure inside the heat pipe, it can essentially block/unblock more or less of the condenser off from the thermal circuit. Such custom heat pipes can be provided by ACT, located in Lancaster, Pennsylvania.

The heat transferred by the variable heat pipes is transferred from the condenser to a high emissivity material radiator, such a Pyrolytic Graphite Sheet or PGS. PGS is good for transmitting heat by radiation and also an excellent heat spreader. The condenser is connected to a radiator and that radiator can either directly radiate or be convective cooling. The PGS is a material that is spreads the heat out very efficiently is super conductive in the plane of the sheet, and is super lightweight, which is desirable in aircraft where weight is an important factor.

Surrounding the firewall enclosure is an insulation made of aircraft grade SOLIMIDE foam, which is very lightweight, in conjunction with, an aerogel vacuum insulation foam in a sandwich configuration. This provides very good thermal resistance, high insulation value, and provides a spacer to provide room for the heat pipe. The SOLIMIDE is used as a spacer and is great heat barrier. The vacuum packed aerogel can not easily formed with little grooves in it, to allow routing of the heat pipes. SOLOMITE is better per unit weight as an insulator and more cost effective, but far worse per unit thickness that the aerogel vacuum insulation. As such, in aircraft applications where space is constrained, the aerogel can be used in conjunction with the SOLIMIDE.

Figure 10:
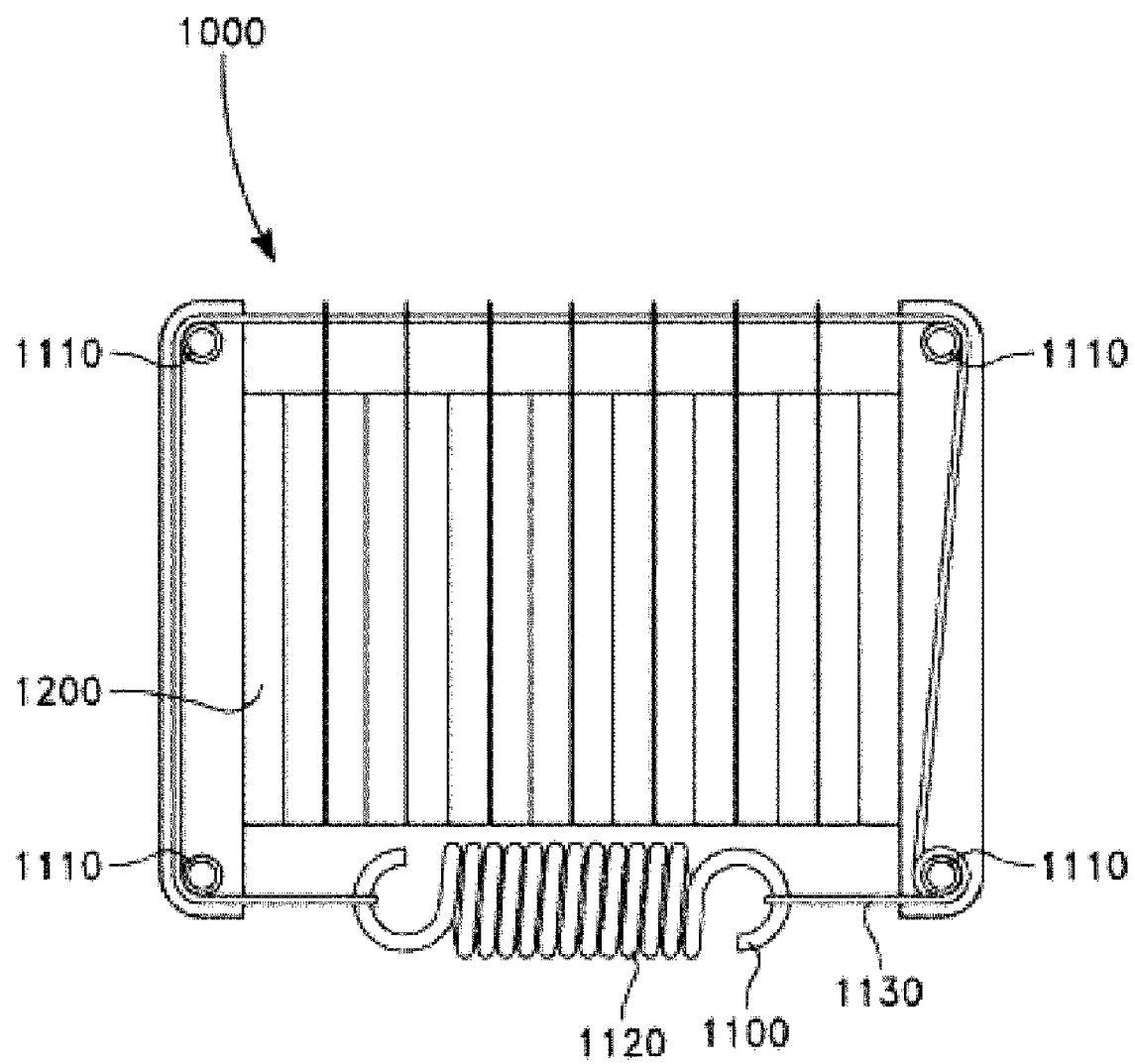
FIG. 10 is a side view of a battery cage.

Turning to FIG. 10, shown is a side view of individual battery cells 1200 seated within a cage associated with or secured to the battery cell support structure, i.e. battery cell rails 631 and a battery preload plate 633. The cage 1000 allows them to expand and contract. The cage 1000 has a pulley 1110 and spring 1120 system 1100 to keep the battery cells 1200 together while allowing them to expand. The spring and pulley system provides and maintains an essentially uniform pressure on the battery cells. Conventional designs use rubber bands, but this is not uniform over a large expansion range, such as the expansion range that is experience during heating and cooling cycles on a solar power aircraft at high altitude and for sustained continuous, or perpetual flight. Rubber bands, or other elastomers, can fatigue or crack much easier. Instead, titanium springs, or other light weight non-fatiguing material are used so that they will be able to cycle many times without diminished performance. With the lithium ion battery packs, every day it cycles its size, and over its life, it increases in size.

The spring and pulley system 1200, which may have only one or more springs 1120, strings 1130, and pulleys 1110 to encircle the cage and hold the battery cells, and compress the battery cells at or about between about 15 and 30 psi. The spring(s) coefficient is selected accordingly. So, in its most compressed state and at its fully expanded state the pressure on the battery cell is within that range. Kevlar twine or thread is used, connected to one side of the cage, wrapped over pulleys on the cage structure to encircle the cage, and connect to a tension spring at an other end to compress the battery cells within the cage. Thus, the spring(s) is(are) under/within the cage to saves space and weight, which is limited in aircraft applications.

The end of the string passes through a hole that passes through one of supporting rods that define the cage. The string is wraps several times around the rod to relieve stress on the string at the edge of the hole.

Within the battery pack, extending between the individual cells of the battery pack are thin sheet heaters. This allows the temperature of the battery to be maintained within its operational temperature, even at high altitude and at night.

Multiple cell batteries, and in particular, multiple cell lithium batteries must be voltage balanced. There will be some voltages that creep up and there could be a big voltage spread, from cell to cell, which could either lead to a danger, or just loss of capacity because a battery cell should not be overcharged. If you have some in the battery pack that have low capacity, the battery must be cell balanced. This is accomplished by lowering the voltage of the higher cells using an external a resistor to bring the voltage of one or more cells down.

To accomplish this, the battery pack heater are utilized for battery cell balancing. Thus, the battery heaters are connected for both battery cell balancing and for heaters. This save space and weights in an aircraft which is space and/or weight constrained. Thus, the resistor in the pack is used as a balancing resistor to bring down high cell voltage, so the heat goes right into the pack and so the heater doubles as a balancing resistor, we use the same resistors for pack heating and balancing. So, for thermal management we turn all 90 of these heaters on, but for cell balancing we only turn a heater (or heaters) on for the cell that needs to be brought down.

There are various levels of control to monitor. One is very basic. If the pack too cold then turn them all on on to preventing a catastrophic freeze of the pack. Otherwise, they perform a slight heating. Or, they may be operated independently, so that some are balancing and others are heating. During balancing because there is substantial thermal mass, 55 pounds of cells and the heat generated from balancing is a pretty gentle heat as well. Each of these heaters is only outputting under a watt of heat so even in the case of balancing there should not be significant hot spots, where it is endangering the cell.

In conventional applications the heaters and the balance resistors are located on the BMS boards, or remotely. In high altitude applications, we do not have much air out there for cooling. In one application, the cells are wired up so there are three cells in parallel. Each of one of the so called triplets has one of the thin sheet heater/balance resistor imbedded. So, one of these heaters is connected to three cells. As such, there are 90 heaters, one per triplet in service. A larger amount, or fewer is possible. In order to fully balance the pack, each cell or group of cells connected in series must have a heater/balance resistor.

Although discussed above with reference to a single vent hole and frangible cover, a battery pack may contain multiple vent holes and plugs, or/and multiple frangible covers. Further, although the frangible vent cover is described and illustrated as completely detaching or separating from the surrounding material, it is possible in some embodiments that it could break away to release the vent plug while only partially detaching or separating from the surrounding material and not entirely detaching or separating.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A battery pack for a vehicle, the battery pack comprising:
    a) a firebox for enclosing batteries;
    b) an electronics compartment;
    c) thermal insulation surrounding the firebox and the electronics compartment; and
    d) heat pipes comprising:
        (1) firebox heat pipes adjacent to the firebox on an evaporator end and extending to an exterior surface of the battery pack on a condenser end; and
        (2) electronics compartment heat pipes extending from within the electronics compartment on an evaporators end and extending through the thermal insulation to the exterior surface of the battery pack on a condenser end.

2. The battery pack of claim 1, wherein the firebox heat pipes comprise variable conductance heat pipes.

3. The battery pack of claim 1, wherein the electronics compartment heat pipes comprise variable conductance heat pipes.

4. The battery pack of claim 1, wherein the firebox heat pipes comprise variable conductance heat pipes and the electronics compartment heat pipes comprise variable conductance heat pipes, and wherein the firebox heat pipes comprise variable conductance heat pipes comprising a first operating temperature range, and wherein the electronics compartment heat pipes comprise variable conductance heat pipes comprising a second operating temperature range.

5. The battery pack of claim 1, wherein the thermal insulation comprises at least one of: a) an aerogel; or b) a vacuum panel insulation.

6. The battery pack of claim 5, wherein the thermal insulation comprises polyimide foam.

7. The battery pack of claim 1, wherein the thermal insulation comprises an outer layer comprising vacuum sealed NANOPORE.

8. The battery pack of claim 7, wherein the thermal insulation comprises an inner layer comprising SOLIMIDE.

9. The battery pack of claim 1 further comprising a pyrolytic graphite sheet secured to an exterior surface of the firebox.

10. The battery pack of claim 9, wherein pyrolytic graphite sheet secured to the exterior surface of the firebox secures the evaporator end of the firebox heat pipes to the firebox.

11. The battery pack of claim 1 further comprising a pyrolytic graphite sheet secured to an inside of the firebox.

12. The battery pack of claim 1 further comprising a pyrolytic graphite sheet secured to an exterior the thermal insulation.

13. The battery pack of claim 12 further comprising a first pyrolytic graphite sheet and a second pyrolytic graphite sheet secured, wherein the first pyrolytic graphite sheet is secured to an exterior of the thermal insulation and wherein the second pyrolytic graphite sheet is secured over the condenser end of the firebox heat pipe to the first pyrolytic graphite sheet.

14. The battery pack of claim 1 further comprising a pyrolytic graphite sheet secured to an exterior the thermal insulation, and wherein the pyrolytic graphite sheet secures the condenser end of the firebox heat pipes to the thermal insulation.

15. The battery pack of claim 1, wherein the further comprising a pressure relief vent extending through the firebox and the thermal insulation to an exterior of the vehicle.

16. The battery pack of claim 15, wherein the pressure relief vent further comprises:
   a) a vent hole extending through the firebox and the thermal insulation to an exterior of the vehicle;
   b) a vent hole plug; and
   c) a pressure relief frangible vent cover at least partially covering the vent hole plug to retain it within the vent hole.

17. The battery pack of claim 16, wherein the pressure relief frangible vent cover is adapted to at least partially cover the vent hole plug until the thermal runaway gases force the vent hole plug from the vent hole.

18. The battery pack of claim 16, wherein the pressure relief frangible vent cover comprises:
   a) a frangible flexure comprising a vent plug cover portion and a weakened region; and
   b) a pad portion surrounding the frangible flexure, the pad portion being separated from the vent plug cover portion by a gap between the vent plug cover portion and the pad portion, the pad portion being connected to the frangible flexure by the weakened region.

19. A method for thermal management of a battery pack, the method comprising:
   a) containing batteries and battery electronics within a firebox;
   b) surrounding the battery pack with vacuum panel or aerogel insulation;
   c) interposing polyimide foam between the firebox and the aerogel insulation; and
   d) providing heat pipes extending from inside the insulation to outside the insulation,
   wherein providing heat pipes comprises providing variable heat pipes comprising a first set of heat pipes having a first operating temperature range adjacent to the electronics and a second set of heat pipes having a second operating temperature range adjacent to the firebox.

* * * * *